(12) United States Patent
Horschke

(10) Patent No.: US 12,508,357 B2
(45) Date of Patent: Dec. 30, 2025

(54) ATTACHMENT AND SECURING DEVICE OF THE ROTOR OF A PERISTALTIC BLOOD PUMP

(71) Applicant: B. Braun Avitum AG, Melsungen (DE)

(72) Inventor: Sebastian Horschke, Hessisch Lichtenau (DE)

(73) Assignee: B. Braun Avitum AG, Melsungen (DE)

( * ) Notice: Subject to any disclaimer, the term of this patent is extended or adjusted under 35 U.S.C. 154(b) by 0 days.

(21) Appl. No.: 18/735,925

(22) Filed: Jun. 6, 2024

(65) Prior Publication Data
US 2024/0408298 A1    Dec. 12, 2024

(30) Foreign Application Priority Data
Jun. 7, 2023    (DE) ...................... 10 2023 115 059.6

(51) Int. Cl.
| | | |
|---|---|---|
| *A61M 5/14* | (2006.01) | |
| *A61M 1/36* | (2006.01) | |
| *A61M 5/142* | (2006.01) | |

(52) U.S. Cl.
CPC .... *A61M 5/14228* (2013.01); *A61M 1/36225* (2022.05)

(58) Field of Classification Search
CPC .......... A61M 5/14228; A61M 5/36225; A61M 5/1621; A61M 5/3621; A61M 60/279;
(Continued)

(56) References Cited

U.S. PATENT DOCUMENTS

| | | |
|---|---|---|
| 4,861,242 A | 8/1989 | Finsterwald |
| 5,062,775 A | 11/1991 | Orth |

(Continued)

FOREIGN PATENT DOCUMENTS

| | | |
|---|---|---|
| DE | 102012105614 A1 | 1/2014 |
| DE | 102012105916 A1 | 1/2014 |

(Continued)

OTHER PUBLICATIONS

Search Report received in German Application No. 10 2023 115 059.6 dated Mar. 7, 2024, with translation, 11 pages.

(Continued)

*Primary Examiner* — Dapinder Singh
(74) *Attorney, Agent, or Firm* — Christopher A. Rothe; CM Law

(57) ABSTRACT

A rotation unit includes a drive shaft and rotor of a peristaltic pump. The drive shaft attaches a rotor of the blood pump, extends along a central axis, and has a head delimited by a groove. A sliding section is arranged on the head. The rotation unit includes the drive shaft and the rotor with tube rollers which is attachable to the drive shaft. The groove has a flank arranged perpendicularly to the central axis. A locking element is movable transversely to the central axis. An abutment section is biased in the direction of the central axis and in the direction of the groove bottom by a spring arranged in the rotor. The abutment section is movable away from the central axis and groove bottom by an actuating section mounted on or formed integrally with the locking element. An abutment surface is arranged perpendicularly to the central axis.

15 Claims, 2 Drawing Sheets

(58) Field of Classification Search
CPC .. A61M 60/38; A61M 60/441; A61M 60/109; A61M 60/113; A61M 60/835; F04B 43/1253; F04B 53/00; F04B 53/22
See application file for complete search history.

(56) References Cited

U.S. PATENT DOCUMENTS

| | | | |
|---|---|---|---|
| 6,890,161 B2* | 5/2005 | Paukovits, Jr. | ....... F04B 23/026 222/383.2 |
| 7,547,200 B2 | 6/2009 | O'Mahony et al. | |
| 7,597,546 B2* | 10/2009 | Brieske | .............. F04B 43/1253 417/477.11 |
| 8,834,399 B2* | 9/2014 | Muller-Spanka | ... A61M 60/279 604/4.01 |
| 9,415,911 B2 | 8/2016 | Schaefer | |
| 9,562,529 B2 | 2/2017 | Schaefer | |
| 2003/0180163 A1* | 9/2003 | Hartmann | ................ H02K 7/14 417/423.6 |
| 2004/0191086 A1* | 9/2004 | Paukovits, Jr. | ..... F04B 43/1269 417/313 |

FOREIGN PATENT DOCUMENTS

| | | |
|---|---|---|
| EP | 1249609 A1 | 10/2002 |
| EP | 2682604 A1 | 1/2014 |
| WO | 2007080499 A1 | 7/2007 |

OTHER PUBLICATIONS

Search Report received in European Application No. 24179561.6-1113 dated Oct. 1, 2024, with translation, 7 pages.

* cited by examiner

ATTACHMENT AND SECURING DEVICE OF THE ROTOR OF A PERISTALTIC BLOOD PUMP

CROSS-REFERENCE TO RELATED APPLICATION

This application claims priority under 35 U.S.C. § 119 to German Application No. 10 2023 115 059.6, filed on Jun. 7, 2023, the content of which is incorporated by reference herein in its entirety.

FIELD

The disclosure relates to a peristaltic blood pump for a medical apparatus for extracorporeal blood treatment. Blood pumps of this type include a pump housing comprising a curved track-type running surface and a rotor rotatable within the running surface, a tube segment being inserted between the running surface and the rotor. The rotor can be arranged on a drive shaft of the blood pump by a shaft mount, and a locking element is provided for axial securing. Peristaltic pumps of this type are also referred to as tube roller pumps.

The present disclosure concretely relates to the drive shaft and the attaching and securing device of the rotor of a peristaltic blood pump of this type.

BACKGROUND

In medical apparatuses for extracorporeal blood treatment (dialysis), frequently peristaltic tube pumps are used which convey the blood collected from the patient to a dialyzer and back to the patient. A circularly curved tube segment abuts with its outer face on a correspondingly curved inner running surface of the pump housing. A rotor of the blood pump located inside the tube segment then moves by rollers arranged thereto along the tube segment, wherein the rollers press the tube locally radially outward and, in doing so, by the elastic material properties of the tube generate a blood transport through the tube. For this purpose, the blood is supplied to the tube via a first port and is discharged again via another port at the other end of the tube. The tube in this way forms, for example together with the supply and discharge lines and plural air traps, a so-called transition system by which blood of the patient is conveyed to a dialyzer and back to the patient.

From EP 2 682 604 A1 a peristaltic blood pump is known. The torque is transmitted from the drive shaft to the rotor by a positive fit. Furthermore, the rotor can be removed from the drive shaft so that the tube can be replaced. To this end, the rotor is axially secured on the drive shaft by an equally positive snap mechanism or latch mechanism. An axially acting locking element is movable by means of a manual and spring-mounted press-button switch, allowing the rotor to be released and to be axially removed. The switch is positioned so that it can be pressed down at the same time as the operator of the blood pump and the dialysis machine, resp., grips the rotor.

Attaching the rotor to the non-rotationally symmetric drive shaft in by far most cases is related for the operators to sensitively following a rotary movement of the rotor which is forced by the drive shaft. Said forced rotary movement of the rotor always is a bit of a challenge in terms of skill and/or patience for the hospital staff frequently being under time pressure.

This drawback is eliminated in a peristaltic blood pump known under the name Dialog+ of the applicant which has a rotationally symmetric drive shaft allowing the forced rotary movement to be omitted when the rotor is attached. The torque is transmitted from the drive shaft to the rotor during operation of the blood pump via a circumferential frictional connection on the circular cylindrical abutment area of the outer casing of the drive shaft, which also forms a freewheel. For releasing the rotor from the drive shaft, a switch must be pressed which is arranged on the surface of the rotor and the actuating surface of which is flush with the housing wall of the rotor there. The actuating surface of the switch and that housing wall are arranged perpendicularly to the drive shaft. Therefore, when gripping the rotor, the operating staff cannot actuate at the same time the switch with the same finger with which also the rotor is gripped and removed.

In the peristaltic blood pump known under the name Dialog+ by the applicant, the rotor and the tube segment are arranged in a bowl-like area of the blood pump in the center of which the rotationally symmetric drive shaft protrudes pin-like from the bottom. The drive shaft has a head and a peripheral groove which is delimited by a bottom-side inclined flank and by a head-side flank with maximum pitch. In other words, the head-side flank of the groove takes the shape of a circular ring which is oriented perpendicularly to the central axis of the drive shaft. A locking element bears against said head-side flank, when a force is applied to the rotor away from the bottom in the direction of removal of the rotor, and unless at the same time the actuating surface of the switch is pressed.

A rounded section, which serves for easier attachment of the rotor is provided at the head in the transition between a circular cylindrical casing and a circular disk-shaped end face.

SUMMARY

It is the object of the present disclosure to provide a drive shaft for a peristaltic blood pump and a rotation unit consisting of a drive shaft and a rotor for a peristaltic blood pump, in which the attachment of the rotor is further simplified.

The drive shaft according to the disclosure is arranged and designed to be received by attaching a rotor of a peristaltic blood pump. The drive shaft extends along its central axis and includes at a free end section a rotationally symmetric head. The head is delimited by a groove, which is adjacent viewed along the central axis. A conical or frustoconical sliding section formed by a chamfer is arranged at the head. Thus, the mounting force of the rotor is small. In this way, also an insertion aid for the rotor is provided which tolerates an axial displacement and a non-vertical attaching movement and which prevents the rotor from getting caught.

Preferably, the sliding section extends, viewed along the central axis of the drive shaft, over 30 to 40%, preferably 35% of the axial extension (of the length) of the head.

The sliding section preferably has an angle in the range from 5° to 20°, in a concrete embodiment of 15°, to the central axis of the drive shaft.

On the side of the chamfer and the sliding section, resp., remote from the groove, the complete end face of the drive shaft can be designed to be spherical. As an alternative, the head of the drive shaft can have a front face, wherein a transition from the chamfer and the sliding section, resp., to the front face is rounded with a radius of preferably more than 1 mm, and 1.5 mm in a concrete embodiment. In both cases, attachment of the rotor is further simplified and the rotor is prevented from getting caught.

Preferably, between the chamfer and the sliding section, resp., and the groove a circular cylindrical head section (known per se from the state of the art) is provided which extends—viewed along the central axis of the drive shaft—preferably over 15 to 25%, and in a concrete embodiment 20%, of the axial extension (of the length) of the head.

A transition from the sliding section to the circular cylindrical head section is preferably rounded with a radius preferably between 2 to 6 mm, in a concrete embodiment 4 mm. Consequently, attachment of the rotor is further simplified and the rotor is prevented from getting caught.

By the above-described configurations of the drive shaft, a keyless attachment of the rotor can be realized in a relatively small available space.

Preferably, a transition from the circular cylindrical head section to the groove is rounded with a radius preferably between 0.1 to 0.3 mm, of 0.25 mm in a concrete embodiment. Said rounded section is mainly used for easier removal of the rotor so that the latter does not get caught during removal. The rounded section is comparatively small so that it does not have a major impact on the undercut of the locking element.

In a preferred development of the drive shaft, a circular cylindrical abutment area of or for a friction coupling is formed on a side of the groove remote from the head. A drive-side groove flank interposed between a groove bottom of the groove and the circular cylindrical abutment area is conically or frustoconically inclined relative to the central axis. A transition from the groove flank to the circular cylindrical abutment area is rounded with a radius preferably between 1.5 and 4 mm, of 2 mm in a concrete embodiment. This ensures that the fits in the rotor, which serve as a bearing position can be easily passed over said position and the rotor does not get caught when it is attached.

The head, the groove and the abutment area are particularly preferred to be rotationally symmetrical for the frictional drive. This ensures that the rotor can be attached onto the shaft in any rotating position and the correct rotating position does not have to be found first.

The rotation unit according to the disclosure is designed for a peristaltic blood pump and includes an afore-described drive shaft and a rotor with tube rollers which is or can be attached thereto. The groove has a groove flank facing the head and therefore being referred to as a head-side groove flank which is arranged perpendicularly to the central axis and, consequently, preferably takes the shape of a circular ring with maximum pitch. A locking element that is movable transversely to the central axis of the drive shaft is arranged in the rotor. An abutment section of the locking element is biased radially in the direction of the central axis and in the direction of the groove bottom by means of a spring, wherein the abutment section is movable in the direction radially away from the central axis and in the direction away from the groove bottom by means of an actuating section. The actuating section is mounted on or formed integrally with the locking element. At least one abutment surface of the abutment section or the entire abutment section is arranged, just as the head-side groove flank, perpendicularly to the central axis. When a force is applied to the rotor away from the bottom of the housing in the direction of removal of the rotor, and when the actuating section is not pressed, a secure fit of the rotor during operation of the blood pump results, on the one hand, from the perpendicular orientation of the head-side groove flank and, on the other hand, from the abutment surface of the abutment section.

The actuating section can be an actuating surface, for example, but it can also take a different, such as spherical, shape.

Preferably, the abutment section is arranged on a side of the drive shaft opposite to the actuating section. Then, pressing the actuating section toward the drive shaft causes the abutment section to move out on the other side of the drive shaft. To this end, a bridging section is required on the locking element, which connects the actuating section with the abutment section. The bridging section preferably extends along one side of the drive shaft and preferably connects the actuating section integrally with the abutment section.

If the spring is a compression spring, it is also arranged on the side of the drive shaft opposite to the actuating section.

In a particularly preferred configuration of the locking element, the abutment section is circular arc-shaped and extends in a peripheral region of the groove. Preferably, the abutment section extends over 80° to 96° along the circumference of the groove. With an increasing extension in the direction of the actuating section, the path of the entire locking element that is required to move its abutment section completely out of the groove is increased. This increases the safety against inadvertent unlocking of the rotor.

In a simple device configuration, the locking element including the actuating section, the bridging section and the abutment section is a punched sheet metal part. The actuating section can be formed by bending or chamfering about 90°, for example.

In a preferred configuration, the actuating section has a smaller distance from the drive shaft than a housing section of the rotor surrounding the actuating section. Therefore, the actuating section is countersunk in the housing section of the rotor, and the safety against inadvertent pressing and, thus, unlocking of the rotor is increased.

In a preferred configuration, the spring causes a breakaway force, viz. an actuating force on the actuating element starting from a locking position—of at least 10 N. In this way, the protection against inadvertent unlocking of the rotor is increased as compared to the state of the art. When the breakaway force is increased, the finger force that is required to move the abutment section completely out of the groove is increased. This can further increase the safety against inadvertent unlocking of the rotor.

A removing force for the rotor amounts to at least 12 N.

DETAILED DESCRIPTION

In the following, an embodiment of the rotation unit with an embodiment of the drive shaft is described on the basis of the associated Figures.

Figure 1:
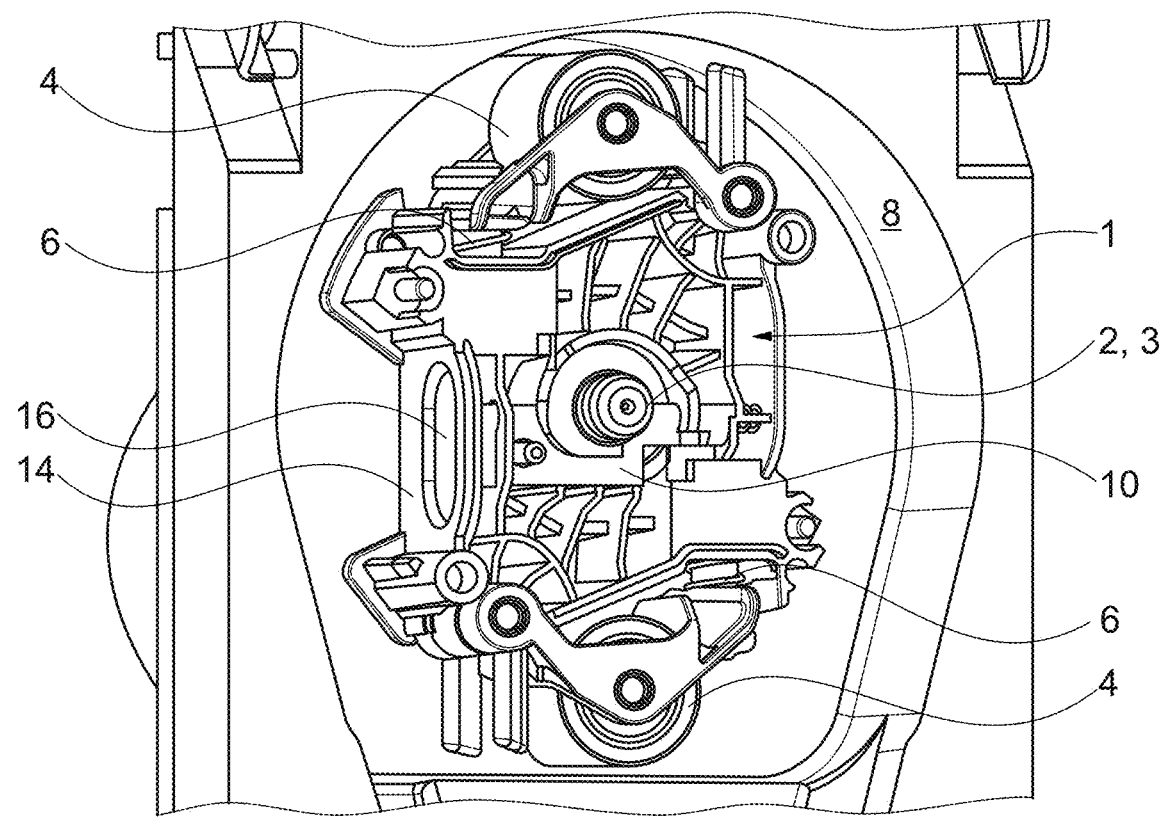
FIG. 1 is a peristaltic blood pump comprising a rotation unit according to the embodiment of the present disclosure.

FIG. 1 is a peristaltic blood pump comprising a rotation unit according to the embodiment of the present disclosure. The rotation unit includes a rotor 1 and a pin-shaped drive shaft 2 of which (in FIG. 1) only the head 3 is visible.

The rotor 1 has, distributed on its circumference, two rollers 4 which are tensioned, via the force of a respective pressure spring 6, outwardly in the direction of a track-like running surface 8. The running surface 8 is circular arc-shaped at least in a central area. A tube segment of a tube (not shown) is applied to the running surface 8. The blood to be conveyed is conveyed through the tube segment abutting on the running surface 8 in which the rollers 4 press in the tube segment and the pressed position is moved along the tube segment corresponding to the rotation of the rotor 1.

Since, in FIG. 1, a housing cover of the rotor 1 is removed, the head 3 of the drive shaft 2 is visible. The rotor 1 is held in the axial direction on the drive shaft 2 by a locking element 10 in the form of a locking plate. The latter includes an actuating section 12 which is designed as an actuating surface and is disposed radially inside a housing section 14 of the rotor 1. The operating staff can press the actuating section 12 through a through-recess 16 of the housing section 14 so as to release the axial locking and remove the rotor 1 from the drive shaft 2.

Figure 2:
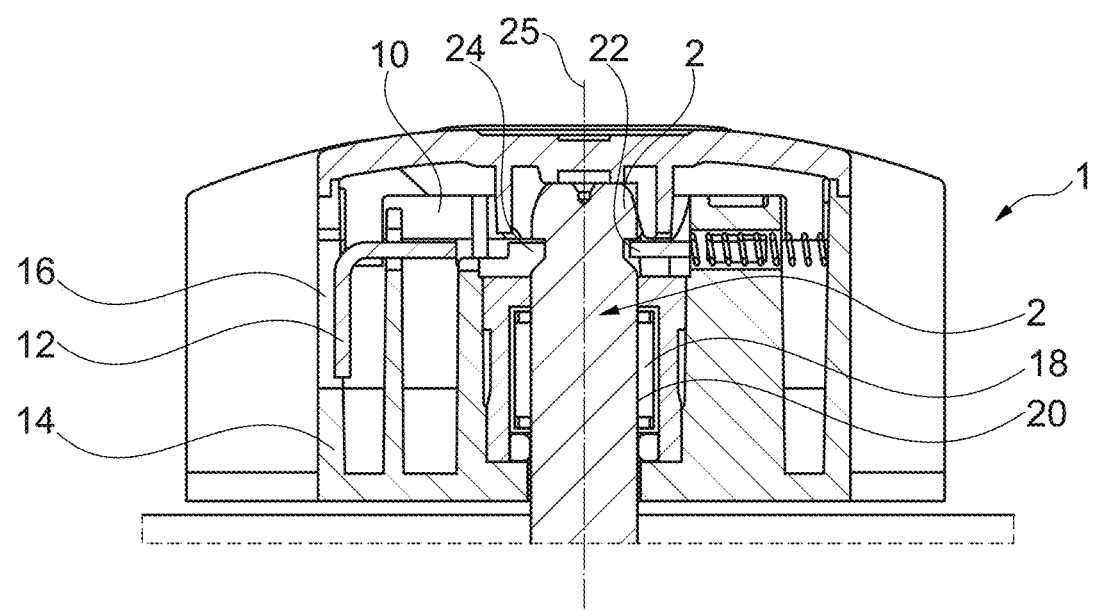
FIG. 2 is a cut representation of the rotation unit from FIG. 1.

FIG. 2 shows a cut representation of the rotation unit from FIG. 1. The rotor 1 is non-rotatably connected to a circular cylindrical abutment area 20 of the drive shaft 2 via a friction coupling 18 in a conveying direction, while there is a freewheel in the opposite direction.

The locking element 10 is formed integrally as a stamped and bent part and has an abutment section 22 which immerses into a circumferential groove 24 of the drive shaft 2 rotationally symmetrical to the central axis 25 so as to prevent the rotor 1 from being axially removed (upwards in FIG. 2).

The locking element 10 includes the actuating section 12 produced by bending which is designed as an actuating surface and which can also be regarded as a press button. The actuating section 12 is radially recessed vis-à-vis the housing section 14. In this way, the rotor 1 is prevented from being inadvertently actuated and thus released. The actuating section 12 is oriented approximately in parallel to the central axis 25. Thus, the finger with which the rotor 1 is released can also be used to remove the rotor 1 with one hand. The through-recess 16 in the housing section 14 also serves for retaining the finger safely on the rotor 1.

Figure 3:
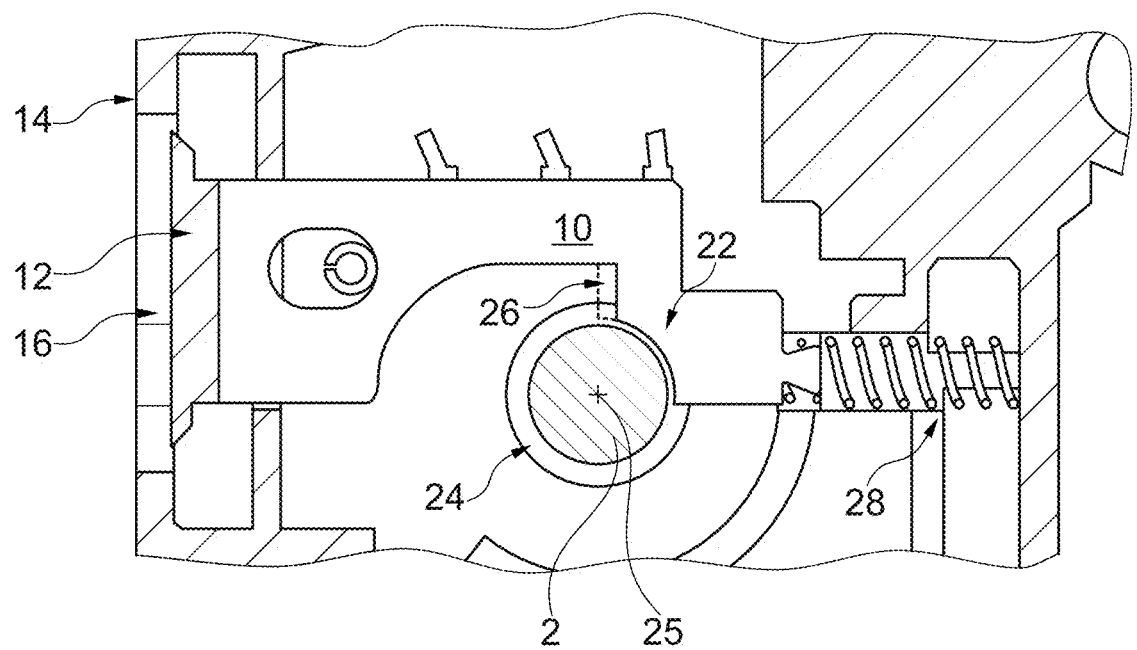
FIG. 3 is a cutout of the rotation unit from FIG. 1 in another cut representation with two variants of an abutment section.

FIG. 3 is a cutout of the rotation unit from FIG. 1 in a section across the drive shaft 2. In particular, a main section of the locking element 10 is shown in a view (from below), and the actuating section 12 is shown as cut in its bent transition to the main section of the locking element 10.

The locking element 10 encompasses the drive shaft 2 on one side, and in other words, the locking element 10 has a partially concave recess in which the drive shaft 2 is disposed. At the edge of said recess, a circular arc-shaped abutment section 22 is formed which is tensioned in the direction of the groove 24 of the drive shaft 2 by means of a spring 28. The spring 28 is arranged on a side opposite to the actuating section 12 with respect to the drive shaft 2 and is designed as a pressure spring. The spring 28 causes a breakaway force at the actuating element 12 of at least 10 N, and a removal force for the rotor 1 amounts to at least 12 N. This ensures high safety against inadvertent unlocking and releasing of the rotor 1.

A smaller variant of the abutment section 22 is shown by a continuous line. Said variant and, resp., said abutment section 22 extends approx. 82° around the groove 24 and the drive shaft 2, respectively.

The distance required to move out the abutment section 22 can be enlarged when an optional enlargement 26 is provided at the abutment section 22 (shown in a dotted line). Said variant extends approx. 90° around the groove 24 and the drive shaft 2, respectively.

Figure 4:
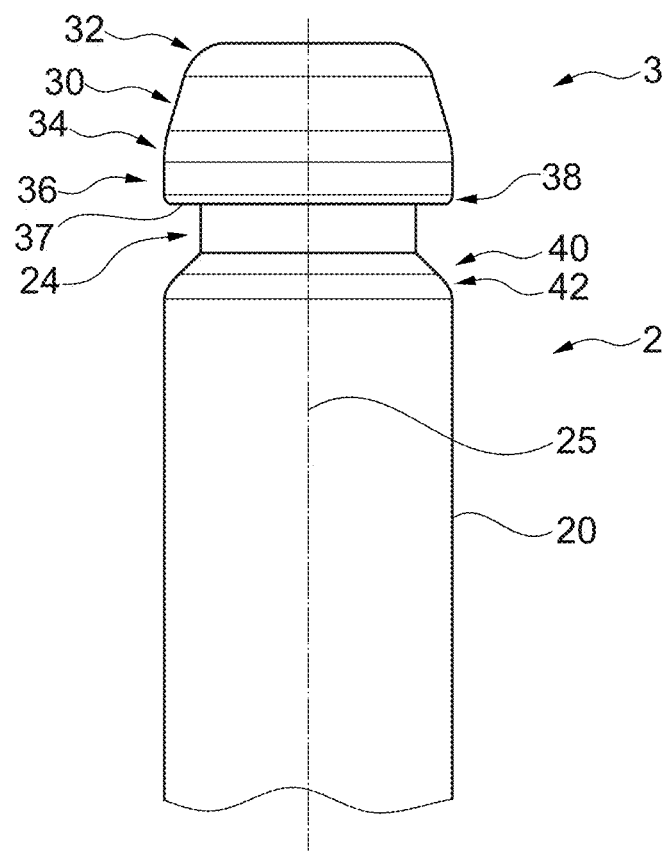
FIG. 4 is a view of the part of the drive shaft essential for the disclosure from the preceding Figures.

FIG. 4 shows a view of the part of the drive shaft 2 of the preceding Figures onto which the rotor 1 is attached. Said part of the drive shaft 2 extends along its central axis 25 and, at a free end section, includes the head 3 which is delimited by the groove 24—adjacent as seen along the central axis 25—. A conical or frustoconical sliding section 30 formed by a chamfer is arranged on the head 3. In this way, the mounting force for the rotor 1 is low. Consequently, also an insertion aid for the shaft mount of the rotor 1 is provided which tolerates an axial displacement and a non-vertical attaching movement and prevents the rotor 1 from getting caught.

The sliding section 30 extends—viewed along the central axis 25 of the drive shaft—over approx. 35% of the axial extension (of the length) of the head 3 and has an angle of 15° to the central axis 25 of the drive shaft 3.

On the side of the chamfer remote from the groove 24, the head 3 includes a front face, wherein a transition from the chamfer and the sliding section 30, resp., to the front face is rounded with a radius of about 1.5 mm. As a result, the attachment of the rotor 1 is further simplified and the rotor 1 is prevented from getting caught.

Between the chamfer and the sliding section 30, resp., and the groove 24 there is provided a circular cylindrical head section 36 which extends—viewed along the central axis 25 of the drive shaft 2—over approx. 20% of the axial extension (of the length) of the head 3. A transition from the sliding section 30 to the circular cylindrical head section 36 is rounded with a radius 34 of 4 mm. This ensures that the attachment of the rotor 1 is further simplified and the rotor 1 is prevented from getting caught.

A transition from the circular cylindrical head section 36 to the head-side groove flank 37 of the groove 24 is rounded with a radius 38 of 0.25 mm. Said rounded section 38 is primarily used for easier removal of the rotor 1 so that the latter does not get caught so easily when it is removed. The rounded section or the radius 38, resp., is comparatively small so that there is no major impact on the undercut of the locking element 10.

The circular cylindrical abutment area 20 of the friction coupling 18 is formed on a side of the groove 24 remote from the head 3. A drive-side groove flank 40 interposed between a groove bottom of the groove 24 and the circular cylindrical abutment area 20 is inclined conically or frustoconically relative to the central axis 25. A transition 42 from the groove flank 40 to the circular cylindrical abutment area 20 is rounded with a radius 42 of 2 mm. This ensures that the fits inside the rotor 1, which are used as a bearing position can be passed easily over the transition 42 and the rotor 1 does not get caught when it is attached.

Summing up, in the foregoing embodiments a peristaltic pump is shown the drive shaft 2 of which is rotationally symmetric so that a rotor 1 to be attached can be attached without any pressure upon the actuating section 12 and without complying with a predetermined rotating position. Accordingly, due to the conical or frustoconical sliding section 30 on the head 3 of the drive shaft 2 which are formed by a chamfer, also deviations from the ideal mounting direction are tolerated.

In order to prevent the rotor 1 from being inadvertently released from the drive shaft 2, at least one of the following measures can be additionally provided:

The actuating section 12 (press button) is countersunk relative to the housing section 14 of the rotor 1.

The spring 28 is designed so that the actuating section 12 has a breakaway force of 10 N.

The abutment section 22 (with its abutment area for the head-side groove flank) extends on an arc of 90° around the groove 24.

LIST OF REFERENCE NUMERALS 1 rotor
2 drive shaft
3 head
4 roller
6 pressure spring
8 running surface
10 locking element
12 actuating section
14 housing section
16 through recess
18 coupling
20 abutment area (of the drive shaft)
22 abutment section (of the locking element)
24 groove
25 central axis
26 enlargement of the abutment section (of the locking element)
28 spring
30 sliding section
32 transition/radius
34 transition/radius
36 circular cylindrical head section
37 head-side groove flank
38 transition/radius
40 drive-side groove flank
42 transition/radius

The invention claimed is:

1. A drive shaft for a peristaltic blood pump, which is arranged and designed for attaching a rotor of the peristaltic blood pump, wherein the drive shaft comprises:
   a shaft extending along a central axis to a free end;
   a groove formed in the shaft and spaced from the free end; and
   a head between the free end and the groove, the head being rotationally symmetrical, wherein the head comprises a sliding section that is conical or frustoconical and is formed by a chamfer.

2. The drive shaft according to claim 1, wherein the sliding section extends, viewed along the central axis, over 30 to 40% of an axial extension of the head.

3. The drive shaft according to claim 1, wherein the sliding section has an angle in a range from 5° to 20° to the central axis of the drive shaft.

4. The drive shaft according to claim 1, wherein the head has a front face at the free end, wherein a transition from the front face to the sliding section is rounded.

5. The drive shaft according to claim 1, wherein a circular cylindrical head section is provided between the sliding section and the groove.

6. The drive shaft according to claim 5, wherein the circular cylindrical head section extends, viewed along the central axis of the drive shaft, in a range from 15 to 25% of an axial extension of the head.

7. The drive shaft according to claim 5, wherein a transition from the sliding section to the circular cylindrical head section is rounded.

8. The drive shaft according to claim 5, wherein a transition from the circular cylindrical head section to the groove is rounded.

9. The drive shaft according to claim 1, wherein a circular cylindrical abutment area is formed on a side of the groove remote from the head, wherein a drive-side groove flank interposed between a groove bottom and the circular cylindrical abutment area is conical or frustoconical, wherein a transition from the drive-side groove flank to the circular cylindrical abutment area is rounded.

10. The drive shaft according to claim 1, wherein the groove includes a head-side groove flank which is arranged perpendicularly to the central axis.

11. A rotation unit for a peristaltic blood pump comprising:
    a drive shaft according to claim 1; and
    a rotor including tube rollers which is or can be attached to said drive shaft,
    wherein the groove has a groove bottom and a head-side groove flank that is arranged perpendicularly to the central axis, and wherein a locking element arranged in the rotor is movable transversely to the central axis, wherein an abutment section of the locking element is biased in a direction of the central axis and in a direction of the groove bottom by a spring, wherein the abutment section is movable in the direction away from the central axis and in the direction away from the groove bottom by an actuating section mounted on or formed integrally with the locking element, wherein an abutment surface of the abutment section is arranged perpendicularly to the central axis.

12. The rotation unit according to claim 11, wherein the abutment section is arranged on a side of the drive shaft opposite to the actuating section.

13. The rotation unit according to claim 12, wherein the abutment section is circular arc-shaped and extends in a circumferential area of the groove.

14. The rotation unit according to claim 11, wherein the actuating section has a smaller distance from the drive shaft than a housing section of the rotor surrounding the actuating section.

15. The rotation unit according to claim 11, wherein—starting from a locking position—the locking element has a breakaway force of at least 10 N.

* * * * *